United States Patent
Hammer et al.

[11] 3,867,182
[45] Feb. 18, 1975

[54] TUBULAR CASING OF CELLULOSE HYDRATE WITH A FAT AND WATER REPELLENT INNER SURFACE AND PROCESS FOR THE MANUFACTURE THEREOF

[75] Inventors: Klaus-Dieter Hammer, Finthen; Wolfgang Klendauer, Wiesbaden; Erich Schuierer, Altoetting, all of Germany

[73] Assignee: Kalle Aktiengesellschaft, Wiesbaden-Biebrich, Germany

[22] Filed: Dec. 3, 1973

[21] Appl. No.: 420,965

[30] Foreign Application Priority Data
Dec. 6, 1972 Germany............................ 2259671

[52] U.S. Cl............ 117/95, 117/145, 117/161 LN, 260/29.4 R
[51] Int. Cl............................................. B44d 1/02
[58] Field of Search .............. 117/95, 145, 161 LN; 260/29.4 R

[56] References Cited
UNITED STATES PATENTS

| | | | |
|---|---|---|---|
| 2,708,645 | 5/1955 | Norman............................ | 117/95 X |
| 3,378,379 | 4/1968 | Shiner et al....................... | 117/95 X |
| 3,513,055 | 5/1970 | Brader et al...................... | 117/145 X |
| 3,520,717 | 7/1970 | Brandt et al...................... | 117/145 X |
| 3,560,250 | 2/1971 | Brandt et al...................... | 117/145 X |
| 3,575,708 | 4/1971 | Brandt et al...................... | 117/145 X |
| 3,752,781 | 8/1973 | Muzyczko et al............. | 260/29.4 R |

*Primary Examiner*—Michael R. Lusignan
*Attorney, Agent, or Firm*—James E. Bryan

[57] ABSTRACT

This invention relates to a tubular casing of cellulose hydrate having a coating on its inner side composed of a mixture of substances cross-linked by chemical reaction, which mixture is obtained when an aqueous liquid containing A. 1 to 10 per cent by weight, calculated on the total weight of the liquid, of a water-soluble aminoplast precondensate, B. 1 to 4 per cent by weight, calculated on the total weight of the liquid of a fluorine-containing two-component system from $\beta_1$. polymers of fluorine-containing ethylene imines of the general formula

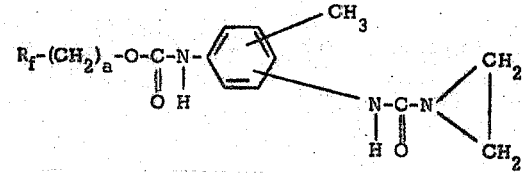

wherein $R_f$ is a straight or branched, saturated perfluorinated carbon chain with 6 to 10 carbon atoms, and $a = 1$ or 2, or polymers from mixtures of the said ethylene imines, dispersed in $\beta_2$. fluorine-containing compounds of the general formula

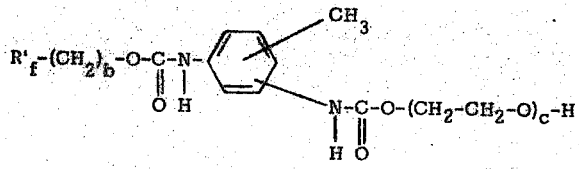

wherein $R'_f$ is a straight or branched, saturated perfluorinated carbon chain with 5 to 7 carbon atoms, $b = 1$ or 2, and $c = 18$ to 50 (corresponding to polyethylene glycol groups with an average molecular weight of about 800 to 2,000), or in mixtures of the above compounds, provided that, in the component B of the liquid, the ratio $\beta_1$ to $\beta_2$ is in the range from 40 : 60 to 60 : 40 per cent by weight, calculated on the total weight of the liquid, and C. a water-soluble cross-linking catalyst, is heated sufficiently to remove the portion of the liquid consisting of water and sufficiently to effect cross-linking, whereby the aminoplast precondensate and/or reaction products of the aminoplast precondensate and the constituents $\beta_1$ and $\beta_2$ of the component B are chemically bonded with the OH groups of the cellulose hydrate forming the tubular casing.

18 Claims, No Drawings

TUBULAR CASING OF CELLULOSE HYDRATE WITH A FAT AND WATER REPELLENT INNER SURFACE AND PROCESS FOR THE MANUFACTURE THEREOF

This invention relates to a tubular casing of cellulose hydrate the inner surface of which is water and fat repellent. This invention particularly relates to tubular casings of the mentioned kind for the manufacture of tubular packages for packing fat and water containing goods. This invention particularly relates to tubular casings to be used for the production of sausages.

Another object of the invention is a process for the production of tubular casings of cellulose hydrate the inner surfaces of which are fat and water repellent.

Tubes of synthetic material, particularly those of cellulose hydrate, are used to a large extent for the production of sausages.

The known tubes of cellulose hydrate, however, have the disadvantage that the meat enclosed in the tubular casings produced therefrom adheres so firmly to the inner surface of the tube that smooth peeling of the sausage casing from the sausage meat is not possible or can be performed only unsatisfactorily.

Attempts therefore have been made to overcome the mentioned drawback by applying a chemical agent to the inner side of a tube of cellulose hydrate to prevent adhesion of the sausage meat to the sausage casing. Cellulose hydrate tubes are thus known for use as artificial sausage casings having an inner finish of paraffin, wax, long-chain isocyanates or ethylene imines, long-chain diketenes and complexes of chromium and fatty acid or silicone. The mentioned products are only adhesively bound to the surface of the cellulose hydrate tubular casing. There is thus the risk that they may migrate into the sausage meat, the desired effect of the preparation being lost thereby. Furthermore, the sausage meat is adversely affected by the migration of the chemical agent. Others of the known inner layers are sufficiently firmly adhering to the tube surface but impart to the inner surface only a water repellent effect and do not satisfactorily prevent the adhesion of fat. In particular, a disadvantage in connection with the short-chain precondensates or with the monomer products is that they diffuse particularly easily into the meat in the casing. Apart from the disadvantages involved thereby and mentioned above, the foregoing media also penetrate far into the interior of the tube wall, which means that not only a considerable portion of the effect is lost thereby, but also that cross-linking of the cellulose hydrate takes place with considerable embrittlement of the tube material.

A consequence of embrittlement is that, when the tubes are filled with meat the tubular casings may burst under the filling pressure employed. Since all hitherto known cellulose hydrate tubes have only an inner preparation with a water repellent effect, the known tubes used as sausage casings do not prevent fat separation and firm adhesion of the sausage meat to the walls of the tubular casings. The sausages thus become unattractive. Furthermore, difficulties arise when smoking the sausages, which may entail an undesirable reduced storability.

The object of the present invention thus is to provide a cellulose hydrate tube which does not have the disadvantages of the known tubes with an inner preparation and which are particularly useful for the production of sausage casings. The present invention provides a cellulose hydrate tube the inner surface of which, due to its finish, is sufficiently water repellent as well as sufficiently fat repellent, the layer on the inner surface of the tube effecting water and fat repellency being so firmly bonded at the tube wall that the material from which it is formed neither migrates into the adjacent filled material nor diffuses into the interior of the tube wall.

Another object of the invention is to provide a process by which it is possible in a simple manner to produce the tubular film of the invention with the interior impregnation.

A substantial requirement in practice is that the tubular casing according to the invention be not injurious to health when used as a sausage casing.

The present invention provides a tubular casing of cellulose hydrate having a coating on its inner side, the coating being a mixture of substances cross-linked by chemical reaction, which mixture is obtained when an aqueous liquid containing A. 1 to 10 per cent by weight, calculated on the total weight of the liquid, of a water-soluble aminoplast precondensate, B. 1 to 4 per cent by weight, calculated on the total weight of the liquid, of a fluorine-containing two-component system from $\beta_1$. polymers of fluorine-containing ethylene imines of the general formula

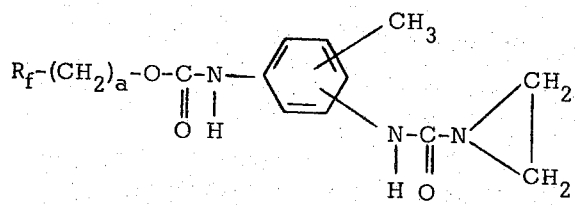

wherein $R_f$ is a straight or branched, saturated perfluorinated carbon chain with 6 to 10 carbon atoms, and $a = 1$ or $2$, or polymers from mixtures of the ethylene imines, dispersed in $\beta_2$. fluorine-containing compounds of the general formula

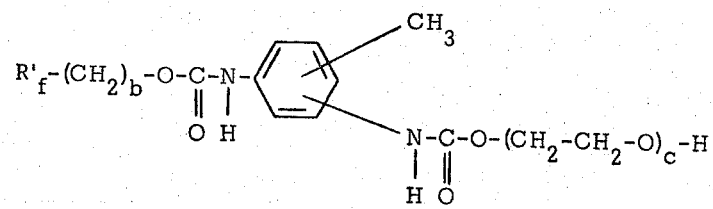

wherein $R'_f$ is a straight or branched, saturated perfluorinated carbon chain with 5 to 7 carbon atoms,
b = 1 or 2, and
c = 18 to 50 (corresponding to polyethylene glycol groups with an average molecular weight of about 800 to 2,000)
or in mixtures of the above compounds, provided that, in the component B of the liquid, the ratio $\beta_1$ to $\beta_2$ is in the range of 40 : 60 to 60 : 40 per cent by weight, calculated on the total weight of the liquid, and C. a water soluble cross-linking catalyst is heated sufficiently to remove the portion of the liquid consisting of water and sufficient to effect cross-linking, whereby the aminoplast precondensate and/or reaction products of the aminoplast precondensate and the constituents $\beta_1$ and $\beta_2$ of the component B are chemically bonded with the OH groups of the cellulose hydrate forming the tubular casing.

According to a variation of the invention, in the tubular casing of cellulose hydrate with a coating on the inner side, the coating is formed from a mixture of substances cross-linked by chemical reaction, which mixture is obtained when an aqueous liquid containing A. 1 to 10 per cent by weight, calculated on the total weight of the liquid, of a water-soluble cyclic urea compound with at least two N-methylol groups, B. 1 to 4 per cent by weight, calculated on the total weight of the liquid, of a fluorine-containing two-component system from
$\beta_1$. polymers of fluorine-containing ethylene imines of the general formula

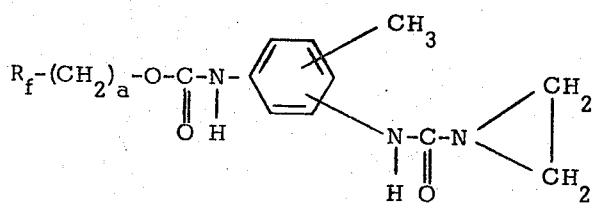

wherein
$R_f$ is a straight or branched, saturated pefluorinated carbon chain with 6 to 10 carbon atoms,
and a = 1 or 2,
or polymers from mixtures of the above ethylene imines, dispersed in
$\beta_2$. fluorine-containing compounds of the general formula

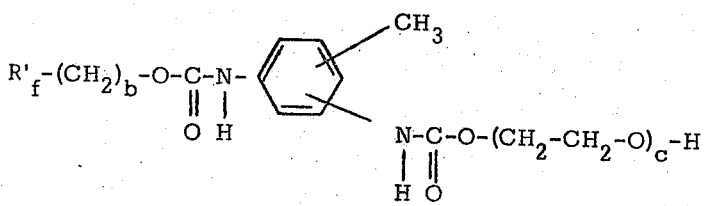

wherein
$R'_f$ is a straight or branched, saturated perfluorinated carbon chain with 5 to 7 carbon atoms, and b = 1 or 2, and
c = 18 to 50 (corresponding to polyethylene glycol groups with an average molecular weight of about 800 to 2,000),
or in mixtures of the above compounds, provided that, in the component B of the liquid, the ratio $\beta_1$ to $\beta_2$ is in the range from 40 : 60 to 60 : 40 per cent by weight, calculated on the total weight of the liquid, and C. a water-soluble cross-linking catalyst is heated sufficiently to remove the portion of the liquid consisting of water and sufficient to effect cross-linking, by which cyclic urea compounds having N-methylol groups and/or reaction products of urea compounds having N-methylol groups with the constituents $\beta_1$ and $\beta_2$ of the component B are chemically bonded with the OH groups of the cellulose hydrate forming the tubular casing.

According to one variation of the invention, the component A in the aqueous liquid is composed of a precondensate from the group of the known aminoplasts, i.e. of condensation products from a condensable amino component with an aldehyde which is present in a quantity from 1 to 10 per cent by weight, preferably 1.5 to 6 per cent by weight, calculated on the total weight of the aqueous liquid. Particularly suitable are precondensates composed on the one hand of formaldehyde and on the other hand of melamine and its derivatives and urea and its derivatives (compare "Angewandte Chemie", 76, 1964, 909–919). The aminoplast precondensate component has a high condensation degree as a result of which it is still soluble in conventional solvents, particularly in water.

According to another variation of the invention, the component A is composed of cyclic urea compounds having at least two N-methylol groups, particularly those of the following structure:

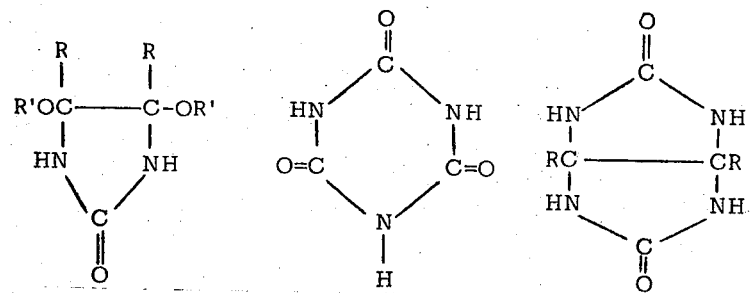

R and R' = short-chain alkyl groups, and preferably H.

R = short-chain alkyl groups, and preferably H.

Particularly preferable cyclic urea derivatives with N-methylol groups are the following: dimethylolethylene urea (1,3-dimethylol-imidazolidone-2), dihydroxy-dimethylol-ethylene urea (1,3-dimethylol-4,5-dihydroxy-imidazolidone-2), dimethylol-ethyltriazinone, 3,5-dimethylol-3,5-diaza-tetrahydropyrone- 4, tetramethylol-acetylene diurea, dimethylol-tetramethyl-propylene urea, and similar products. Particularly preferable, however, are dimethylol-ethylene urea, dimethylol-dihydroxy-ethylene urea, dimethylol-propylene urea, and dimethylol-hydroxy-propylene urea.

The component B of the aqueous liquid is composed of $\beta_1$. polymers of fluorine-containing ethylene imines of the general formula

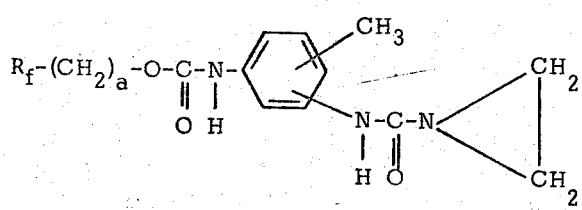

wherein
$R_f$ is a straight or branched, saturated perfluorinated carbon chain with 6 to 10 carbon atoms, and a = 1 or 2,
or polymers from mixtures of the above ethylene imines, dispersed in $\beta_2$. fluorine-containing compounds of the general formula

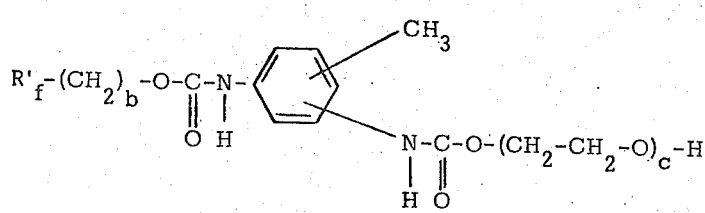

wherein
$R'_f$ is a straight or branched, saturated perfluorinated carbon chain with 5 to 7 carbon atoms,
b = 1 or 2,
and c = 18 to 50 (the latter corresponds to polyethylene glycol groups with an average molecular weight of about 800 to 2,000);
$\beta_2$ also may be composed of mixtures of the above fluorine-containing compounds.

The listed fluorine-containing compounds of the groups $\beta_1$ and $\beta_2$ produce the oil and water repellent effect of the coating, $\beta_2$ having the additional function of converting the practically water-insoluble polymers of $\beta_1$ into stable aqueous dispersions. These two compound classes, their preparation and application in the textile finishing field are described in German D A S No. 1,946,956 (German patent application No. P 19 46 956.8–44). The ratio of $\beta_1$ to $\beta_2$ in the component B is in the range from 40 : 60 to 60 : 40 per cent by weight; preferable is the ratio 50 : 50. From its preparation, component B is an aqueous dispersion containing $\beta_1$ and $\beta_2$ in quantities of 10 to 30, preferably 25, per cent by weight, calculated on the total weight of such a dispersion.

It is also preferably introduced as an aqueous dispersion into the aqueous finishing liquid of the invention, calculated according to the individual quantity to be employed.

Preferably employed polymers of fluorine-containing ethylene imines of the group $\beta_1$ are those in which the $R_f$ group has a chain length of 7 to 8 carbon atoms (straight or branched) or mixtures of the same or mixtures with $R_f$ groups in the range from 6 to 10 carbon atoms, which contain the chain length of 7 and 8 carbon atoms or one of both as the main portion. Particularly preferable fluorine-containing polyethylene glycol derivatives of the group $\beta_2$ are those of the above class in which the number of polyethylene glycol groups is in the range of 23 to 46, which corresponds to an average molecular weight of 1,000 to 2,000. Preferred are polyethylene glycol groups of an average molecular weight of 1,000.

Because of their extraordinarily intense effect, the perfluorinated compounds of component B may be used in relatively small quantities. Their portion in the total aqueous liquid is 1 to 4, preferably 1.6 to 2.4, per cent by weight.

Suitable cross-linking catalysts are, for example, ammonium chloride, magnesium chloride, zinc chloride, zinc nitrate or water-soluble inorganic salts with a similar cross-linking effect. The impregnating liquid contains the catalyst in a quantity between 2 and 5 per cent by weight, preferably between 2 and 3 per cent by weight, calculated on the total weight of the aminoplast precondensate or the cyclic urea compound.

When heated in the temperature range of 100° to 150° C in the presence of the cross-linking catalyst, the components aminoplast precondensate or cyclic urea compound react with the perfluoro compounds with cross-linking.

The presence of the cross-linking agent in the aqueous liquid is necessary to accelerate the chemical reaction leading to cross-linking between the reactive components in the liquid or these and the OH groups of the cellulose hydrate of the tubular material, but in the finished coating the cross-linking agent does not contribute to providing the desired effect of the coating on the inner side of the tube.

It is also possible to use mixtures of various aminoplast precondensates or various cyclic N-methylol urea compounds or mixtures of aminoplast precondensates and cyclic methylol urea compounds.

In the coating on the surface of the tube, the aminoplast component or the cyclic urea component has the function of a binder and carrier in which the fluorine-containing component or its reaction products with the components $\beta_1$ and $\beta_2$ of the component B are uniformly distributed. It is essential for the effect desired in accordance with the invention that the fluorine-containing component be uniformly distributed in the layer.

The cross-linked coating on the inner side of the tubular casing of cellulose hydrate contains not only chemical compounds which are formed by reaction of aminoplast precondensates or cyclic urea compounds containing N-methylol groups with the components $\beta_1$ and $\beta_2$ of the component B but it is essential for the invention that aminoplast precondensates or cyclic compounds containing N-methylol groups and/or reaction products of the constituents $\beta_1$ and $\beta_2$ of the component B with aminoplast precondensate or cyclic urea compounds containing N-methylol groups be firmly bonded with one another by bonding with the OH groups of the cellulose hydrate forming the tube. In accordance with the invention, a cross-linked coating is a coating which is insoluble in all conventional solvents. Conventional solvents are, inter alia, water, aliphatic alcohols, ethers, esters, tetrahydrofuran, dimethyl formamide, and cyclohexanone. The solvents have no saponifying effect on the coating products obtained by cross-linking.

The invention further relates to a process for the production of a tubular casing, in which an impregnating layer is applied to the inner side of the tube. The tube is produced by forcing a viscose solution through a shaping nozzle into a precipitating bath; the tube is then conveyed through regenerating and washing baths and then through a softener bath. In the process, an aqueous liquid is caused to act on the inner surface of the tube in the gel state, which liquid contains A. 1 to 10 per cent by weight, calculated on the total weight of the liquid, of a water-soluble aminoplast precondensate, B. 1 to 4 per cent by weight, calculated on the total weight of the liquid, of a fluorine-containing two-component system from $\beta_1$. polymers of fluorine-containing ethylene imines of the general formula

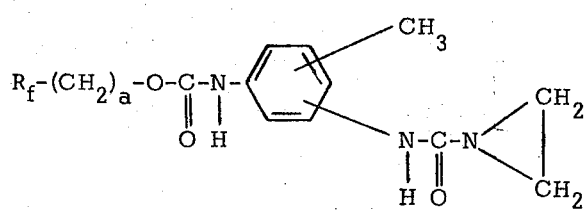

wherein $R_f$ is a straight or branched, saturated perfluorinated carbon chain with 6 to 10 carbon atoms, and a = 1 or 2, or polymers from mixtures of the above ethylene imines, dispersed in $\beta_2$. fluorine-containing compounds of the general formula

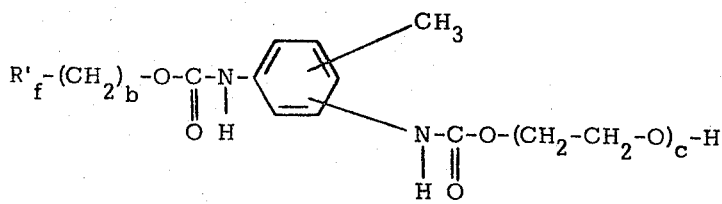

wherein $R'_f$ is a straight or branched, saturated perfluorinated carbon chain with 5 to 7 carbon atoms, b = 1 or 2, and c = 18 to 50 (corresponding to polyethylene glycol radicals with an average molecular weight from about 800 to 2,000)

or in mixtures of the above compounds, provided that, in the component B of the liquid, the ratio $\beta_1$ to $\beta_2$ is in the range from 40 : 60 to 60 : 40 per cent by weight, calculated on the total weight of the liquid, and C. 2 to 5 per cent by weight, calculated on the quantity of the aminoplast precondensate, of a water-soluble inorganic cross-linking catalyst, the tube is then freed from excessive finishing liquid by squeezing, heated for a period of 10 seconds to 5 minutes to a temperature in the range between 100° and 150° C, and then, by wetting with water, brought to a water content in the range from 8 to 12 per cent by weight, calculated on the total weight of the tube. Wetting of the tube with water may be performed, for example, by spraying with water.

Another variation of the invention relates to a process for the production of a tubular casing, in which a viscose solution is pressed through a shaping nozzle in the form of a tube into a precipitating bath, the tube is then conveyed through regenerating and washing baths and then through a softener bath. In this process an aqueous dispersion is caused to act on the inner side of the tube in the gel state, which dispersion contains A. 1 to 10 per cent by weight, calculated on the total weight of the liquid, of a cross-linkable, water-soluble cyclic urea compound containing at least two N-methylol groups, B. 1 to 4 per cent by weight, calculated on the total weight of the liquid, of a fluorine-containing two-component system from $\beta_1$. polymers of fluorine-containing ethylene imines of the general formula

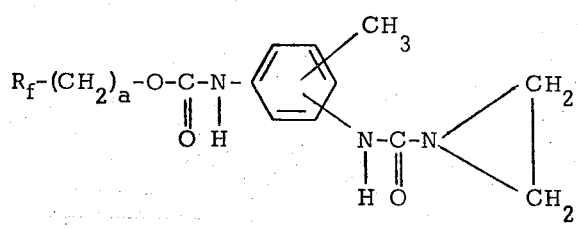

wherein $R_f$ is a straight or branched, saturated perfluorinated carbon chain with 6 to 10 carbon atoms, and a = 1 or 2, or polymers from mixtures of the above ethylene imines, dispersed in $\beta_2$. fluorine-containing compounds of the general formula

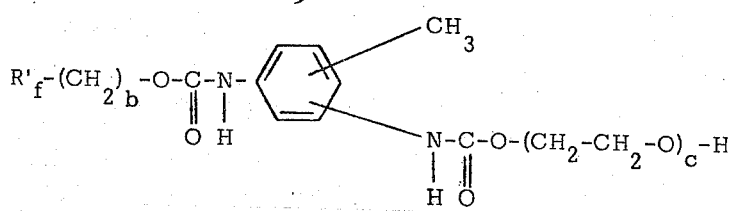

wherein
- $R'_f$ is a straight or branched, saturated perfluorinated carbon chain with 5 to 7 carbon atoms,
- b = 1 or 2,
- and c = 18 to 50 (corresponding to polyethylene glycol groups with an average molecular weight of about 800 to 2,000)

or in mixtures of the above compounds, provided that, in the component B of the liquid, the ratio $\beta_1$ to $\beta_2$ is in the range from 40 : 60 to 60 : 40 per cent by weight, calculated on the total weight of the liquid, and C. 2 to 5 per cent by weight, calculated on the quantity of the cyclic urea compound, of a water-soluble inorganic cross-linking catalyst, the tube is then freed from excessive finishing liquid by squeezing, heated for a period of 10 seconds to 5 minutes to a temperature in the range between 100° and 150°C, and then, by wetting with water, brought to a water content in the range from 8 to 12 per cent, calculated on the total weight of the tube.

The aqueous liquid to be applied to the inner surface of the tube is an aqueous solution or dispersion of the indicated chemical substances (perfluorinated products) and this solution or dispersion is mixed in a container; the catalyst is added to the mixture, preferably also in the form of an aqueous solution. Water is then added in a quantity such that the above components are present in the indicated concentration in the liquid to act upon the tube.

The process of the invention may be easily adapted to the conventional production of cellulose hydrate tubes, i.e. impregnation of the inner side of the tube requires neither process alterations nor additional process steps.

In the production of viscose tubes usually longer tubular sections are produced. After these tubular sections have passed through the usual softener bath, they are usually subsequently dried. In the present case, passing through the softener bath is followed by filling the liquid containing the above constituents into the tube.

The production of the tubular casing or the performance of the process of the invention is described by way of example in the following:

After leaving the softener bath, the viscose tube produced in known manner is not dried, as usual, in the blown-up state, but is treated with the impregnating liquid on its inner surface as long as it is in the gel state.

A tube "in the gel state" means a tube containing 300 to 330 per cent of water, calculated on the total weight, whereas a "ready" tube contains a residual portion of about 8 to 12 per cent of water.

The tube after leaving the softener bath is filled with the impregnating liquid between two squeeze rollers and a guide roller. When continuously conveying the tube through the pair of squeeze rollers, the impregnating liquid in the tube section between the two pairs of squeeze rollers is brought into contact with the inner side of the tube section. The tube is then blown up in known manner and conveyed through a heating tunnel the heat action of which substantially removes the water from the tube. The temperature in the heating tunnel is 80° to 150°C. at a running speed of the tube through the tunnel of 8 to 25 m/minute.

Although the impregnating liquid acts upon the inner side of the tube in the gel state, which fosters intense diffusion of the substances of the impregnating liquid deep into the tube wall, the chain length of the aminoplast precondensate or the spatial molecular structure of the cyclic urea compound as well as of the perfluorinated molecules allows penetration into tube zones near the surface only. An extraordinarily large water and fat repellent effect can be achieved thereby even with very small quantities of the perfluorinated product. For the above reason, the tube does not harden in an undesirable manner since cross-linking of the cellulose molecules in the interior of the tube wall is not possible. The effect of finishing may be judged according to the following methods:

1. WATER REPELLENT EFFECT

The water repellent effect can be judged simply and reliably by way of the wetting angle, formed by a water drop applied by means of a pipet to the impregnated tube surface and that surface.

| Valuation | Wetting angle |
|---|---|
| 1 | above 135° |
| 1 – 2 | 120 – 135° |
| 2 | 90 – 120° |
| 2 – 3 | 90° |
| 3 | no drop formation |

2. OIL REPELLENT EFFECT

The oil repellent effect is judged as follows:

The principle is based on the different wetting powers of two hydrocarbon compounds, namely of Paraffin Oil DAB 6 and n-heptane.

The wetting power of mixtures of these compounds increases with the increase of the n-heptane content. Test mixtures are prepared from these two components:

| Oil repellency | n-heptane, % by volume | Paraffin Oil DAB 6, % by volume |
|---|---|---|
| 0 | paraffin oil | spreading |
| 50 | 0 | 100 |
| 60 | 10 | 90 |
| 70 | 20 | 80 |
| 80 | 30 | 70 |
| 90 | 40 | 60 |
| 100 | 50 | 50 |
| 110 | 60 | 40 |
| 120 | 70 | 30 |
| 130 | 80 | 20 |
| 140 | 90 | 10 |
| 150 | 100 | 0 |

The test solution with the highest n-heptane content which has not spread within 3 minutes on the finished surface of the tube indicates the degree of oil repellency.

According to the process of the invention, oil repellencies above 110 and wetting angles for water drops above 90° are achieved.

The perfluorinated products are either chemically linked to the cellulose hydrate molecules at the surface of the tube wall and/or incorporated in the impregnating film by cross-linking.

The invention will be further illustrated by reference to the following specific examples, in which percentages are by weight;

EXAMPLE 1

Viscose solution, composed of 86 per cent of water, about 2 per cent of carbon disulfide, about 5 per cent of caustic soda, and about 7 per cent of cellulose, and which has a $\mu$-value of 30 (calculated on 100 glucose units) is forced from a circular slot die into a precipitating bath composed of an aqueous solution containing 14 per cent of sodium sulfate and 12 per cent of sulfuric acid, calculated on the total weight of the solution, and, for the purpose of regeneration, passed through several acid and washing baths and then washed in a water bath. Due to the absorption of water, the tube is in the gel state. Subsequently, the tube is passed through a softener bath composed of a 12 per cent glycerol solution. In the gel state means, in this and in the following examples, that the tube contains 300 to 330 per cent of water, calculated on the total weight. A liquid is prepared as follows:

To give 1 liter, there are dissolved in water
30 g of a 50 per cent aqueous solution of a melamine-formaldehyde precondensate,
100 g of a dispersion of fluorine-containing substances which contains $\beta_1$ 12.5 per cent of a polymer of

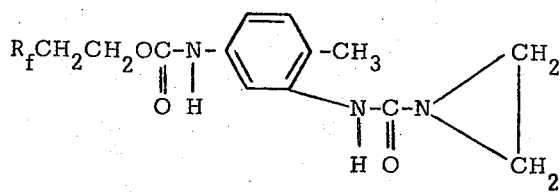

$R_f = C_6F_{13} : C_8F_{17} : C_{10}F_{21} = 1 : 1 : 1$ $\beta_2$ 12.5 per cent of

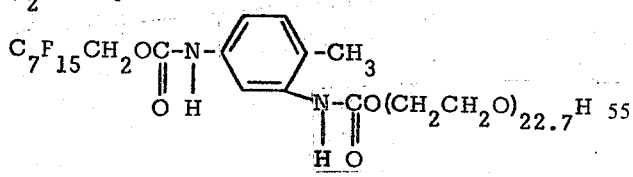

as well as 75 per cent of water,
100 g of glycerol, and
20 g of ammonium chloride.
3 liters of the aqueous liquid prepared as described above are poured into an about 250 m long cellulose hydrate tube in the gel state. The tube is then passed through the gap of a first pair of squeeze rollers, then runs downwardly, is again passed upwardly by a guide roller, and passes through the gap of a second pair of squeeze rollers.

The quantity of liquid poured into the tube is in that tube section which is between the first pair of squeeze rollers, the guide roller, and the second pair of squeeze rollers. The tube is passed at a constant speed of about 10 m/minute through the above-described roller arrangement, the inner wall of the tube being continuously brought into contact with the liquid.

After leaving the roller gap of the second pair of squeeze rollers the tube in the gel state is passed at a speed of about 10 m/minute through a horizontal drier having a length of 53 m. After leaving the gap of the second pair of squeeze rollers, the tube is in the blown-up state because air has been blown into the tube from the tube end. The drier is heated with warm air at a temperature of about 120° C. At the outlet of the drier is a further pair of squeeze rollers through the gap of which the dried tube passes.

After the tube has left the heating channel, it is sprayed on the outside with water. Due to the resulting absorption of water, the ready tubular casing contains about 8 to 12 per cent by weight of water, calculated on the total weight of the tube.

The tube produced as described above has the following properties:
Water drop test: 1 to 2 (wetting angle above 120°)
Oil repellency test: 130
The tube is very flexible and, when used as a sausage casing, can be easily peeled from the sausage meat contained therein.

EXAMPLE 2

The procedure is the same as in Example 1 except that the impregnating liquid is prepared as follows:
To give 1 liter there are dissolved in water
30 g of a 50 per cent aqueous solution of a melamine-formaldehyde precondensate
80 g of a dispersion of fluorine-containing substances which contains $\beta_1$ 12.5 per cent of a polymer of

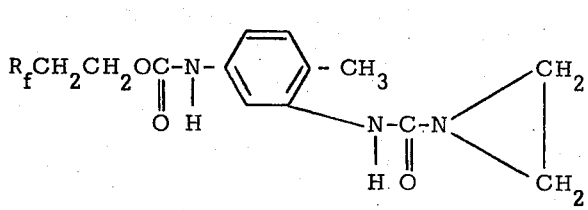

$R_f = C_6F_{13} : C_8F_{17} : C_{10}F_{21} = 1 : 1 : 1$
$\beta_2$ 12.5 per cent of

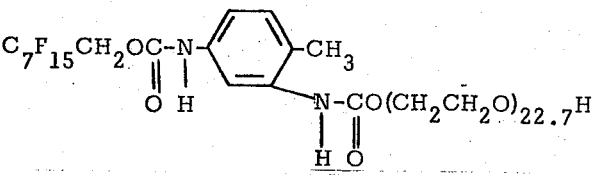

as well as 75 per cent by weight of water,
100 g of glycerol, and
20 g of ammonium chloride.
The finishing and drying conditions are the same as in Example 1. The tube is passed at a speed of 14.5 m/minute through the roller arrangement and through the drying channel.

The tube has the following properties:
Water drop test: 1 to 2 (wetting angle above 120°)
Oil repellency test: 110

When used as a sausage casing, the tube can be peeled from the sausage meat without tearing.

EXAMPLE 3

The procedure is the same as in Example 1 except that the impregnating liquid is prepared as follows:

To give 1 liter, there are dissolved in water 50 g of a 50 per cent aqueous solution of a ureaformaldehyde precondensate, 100 g of a dispersion of fluorine-containing substances which contains $\beta_1$ 12.5 per cent of a polymer of

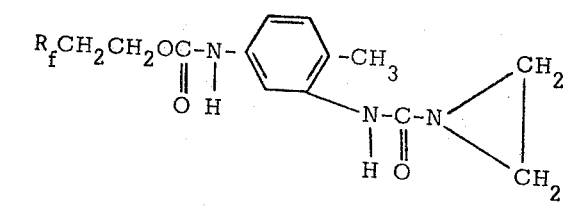

$R_f = C_6F_{13} : C_8F_{17} : C_{10}F_{21} = 1 : 1 : 1$
$\beta_2$ 12.5 per cent of

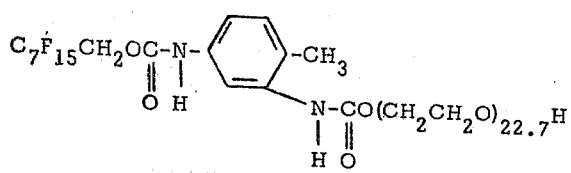

as well as 75 per cent by weight of water,
100 g of glycerol, and
20 g of magnesium chloride.

The finishing and drying conditions are the same as in Example 1. The tube is passed at a speed of 10 m/minute through the roller arrangement and the adjacent drying channel.

Results:
Water drop test: 2 (wetting angle above 90°)
Oil repellency test: 120
When used as a sausage casing, the tube can be easily peeled from the sausage meat.

EXAMPLE 4

The procedure is the same as in Example 1 except that the impregnating liquid is prepared as follows:

To give 1 liter, there are dissolved in water
50 g of a 50 per cent aqueous solution of a ureaformaldehyde precondensate,
80 g of a dispersion of fluorine-containing substances which contains $\beta_1$ 12.5 per cent of a polymer of

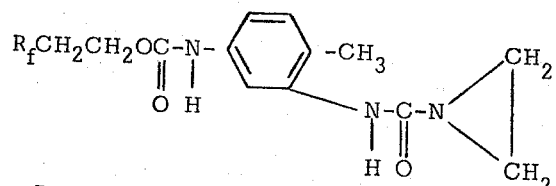

$R_f = C_6F_{13} : C_8F_{17} : C_{10}F_{21} = 1 : 1 : 1$
$\beta_2$ 12.5 per cent of

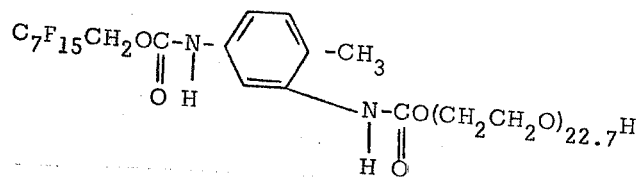

as well as 75 per cent by weight of water
100 g of glycerol, and
20 g of ammonium chloride.

The finishing and drying conditions are the same as in Example 1. The tube is passed at a speed of 9 m/minute through the roller arrangement and the adjacent drying channel.

Properties of the tube:
Water drop test: 1 to 2 (wetting angle above 120°)
Oil repellency test: 130
The tube used as a sausage casing can be easily peeled from the sausage meat.

EXAMPLE 5

The procedure is the same as in Example 3 except that, instead of the aqueous solution of a urea-formaldehyde precondensate, the liquid contains the same quantity of a 50 per cent aqueous solution of dimethylol ethylene urea.

EXAMPLE 6

The procedure is the same as in Example 3 except that, instead of the 50 per cent aqueous solution of a urea-formaldehyde precondensate, the liquid contains the same quantity of a 50 per cent aqueous solution of dimethylol dihydroxyethylene urea.

EXAMPLE 7

The procedure is the same as in Example 3 except that, instead of 50 g of a 50 per cent aqueous solution of urea-formaldehyde precondensate, the liquid contains the same quantity of a 50 per cent aqueous solution of dimethylol propylene urea.

EXAMPLE 8

The procedure is the same as in Example 3 except that, instead of 50 g of a 50 per cent aqueous solution of a urea-formaldehyde precondensate, the liquid contains the same quantity of a 50 per cent aqueous solution of dimethylol hydroxypropylene urea.

EXAMPLE 9

The procedure is the same as in Example 1 except that the liquid contains 80 g of Oilophobol P 68 of Chemische Fabrik Pfersee, Augsburg, Germany, as the fluorine-containing component. This compound is a basic polymer of acrylate which contains substituents of a chain length between $C_6F_{13}$ and $C_{12}F_{25}$ which are perfluorinated via sulfonamide groups. The finishing and drying conditions are the same as in Example 1. The tube is passed at a speed of 10 m/minute through the roller arrangement and the drying tunnel.

Results:
Water drop test: 1 to 2 (wetting angle above 120°)
Oil repellency test: 130

When used as a sausage casing, the tube can be easily peeled from the sausage meat.

EXAMPLE 10

The procedure is the same as in Example 1 except that the liquid is prepared as follows:

To give 1 liter, there are dissolved in water
100 g of a fluorine-containing compound marketed under the trade mark Oilopholbol FC 218 of Chemische Fabrik Pfersee, Augsburg, Germany,
30 g of magnesium chloride, and
100 g of glycerol.

The finishing and drying conditions are the same as in Example 1. The tube is passed at a speed of 10 m/minute through the roller arrangment and the drying tunnel.

Results:
Water drop test: 1 to 2 ( wetting angle above 120°)
Oil repellency test: 130

When used as a sausage casing, the tube can be easily peeled from the sausage meat.

It will be obvious to those skilled in the art that many modifications may be made within the scope of the present invention without departing from the spirit thereof, and the invention includes all such modifications.

What is claimed is:

1. A tubular casing of cellulose hydrate having a coating on its inner side composed of a mixture of substances cross-linked by chemical reaction, which mixture is obtained when an aqueous liquid containing
    A. 1 to 10 per cent by weight, calculated on the total weight of the liquid, of a water-soluble aminoplast precondensate,
    B. 1 to 4 per cent by weight, calculated on the total weight of the liquid, of a fluorine-containing two-component system from
        $\beta_1$. polymers of fluorine-containing ethylene imines of the general formula

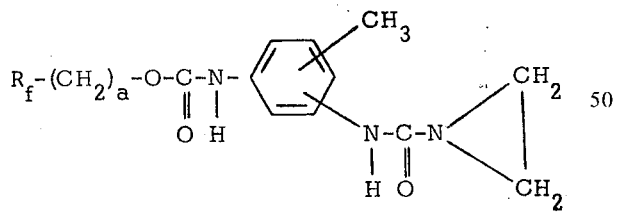

wherein
  $R_f$ is a straight or branched, saturated perfluorinated carbon chain with 6 to 10 carbon atoms, and a = 1 or 2, or polymers from mixtures of the said ethylene imines, dispersed in
  $\beta_2$. fluorine-containing compounds of the general formula

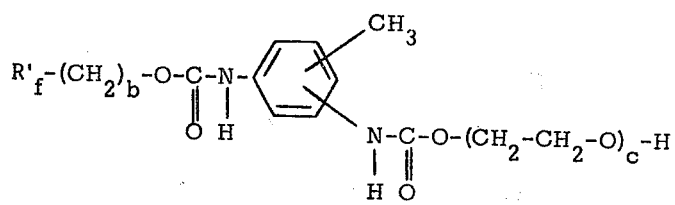

wherein
  $R'_f$ is a straight or branched, saturated perfluorinated carbon chain with 5 to 7 carbon atoms,
  b = 1 or 2,
  and c = 18 to 50 (corresponding to polyethylene glycol groups with an average molecular weight of about 800 to 2,000),
or in mixtures of the above compounds, provided that, in the component B of the liquid, the ratio $\beta_1$ to $\beta_2$ is in the range from 40 : 60 to 60 : 40 per cent by weight, calculated on the total weight of the liquid, and
    C. a water-soluble cross-linking catalyst is heated sufficiently to remove the portion of the liquid consisting of water and sufficiently to effect cross-linking, whereby the aminoplast precondensate and/or reaction products of the aminoplast precondensate and the constituents $\beta_1$ and $\beta_2$ of the component B are chemically bonded with the OH groups of the cellulose hydrate forming the tubular casing.

2. A tubular casing according to claim 1, in which the component A of the aqueous liquid is composed of 1 to 10 per cent by weight, calculated on the total wieght of the liquid, of a water-soluble urea-formaldehyde precondensate.

3. A tubular casing of cellulose hydrate having a coating on its inner side, said coating being formed from a mixture of substances cross-linked by chemical reaction, which mixture is obtained when an aqueous liquid containing
    A. 1 to 10 per cent by weight, calculated on the total weight of the liquid, of a water-soluble cyclic urea compound having at least two N-methylol groups,
    B. 1 to 4 per cent by weight, calculated on the total weight of the liquid, of a fluorine-containing two-component system from
        $\beta_1$. polymers of fluorine-containing ethylene imines of the general formula

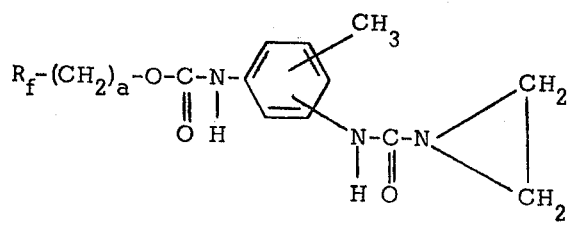

wherein
  $R_f$ is a straight or branched, saturated perfluorinated carbon chain with 6 to 10 carbon atoms, and a = 1 or 2, or polymers from mixtures of the above ethylene imines, dispersed in
  $\beta_2$. fluorine-containing compounds of the general formula

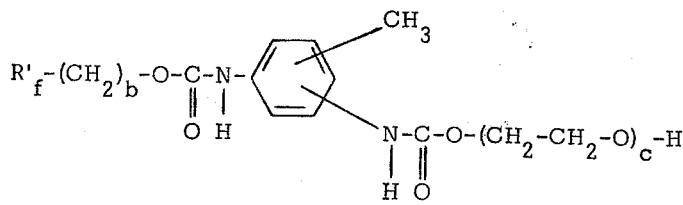

wherein
R′_f is a straight or branched, saturated perfluorinated carbon chain with 5 to 7 carbon atoms, and b = 1 or 2,
and c = 18 to 50 (corresponding to polyethylene glycol groups with an average molecular weight of about 800 to 2,000),
or in mixtures of the above compounds, provided that, in the component B of the liquid, the ratio $\beta_1$ to $\beta_2$ is in the range from 40 : 60 to 60 : 40 per cent by weight, calculated on the total weight of the liquid, and C. a water-soluble cross-linking catalyst is heated sufficiently to remove the portion of the liquid consisting of water and sufficiently to effect cross-linking, whereby the cyclic urea compounds having N-methylol groups and/or the reaction products of urea compounds having N-methylol groups with the constituents $\beta_1$ and $\beta_2$ of the component B are chemically bonded with the OH groups of the cellulose hydrate forming the tubular casing.

4. A tubular casing according to claim 3, in which the component A of the aqueous liquid is composed of 1 to 10 per cent by weight, calculated on the total weight of the liquid, of dimethylol ethylene urea.

5. A tubular casing according to claim 3 in which the component A of the aqueous liquid is composed of 1 to 10 per cent by weight, calculated on the total weight of the liquid, of dimethylol dihydroxy-ethylene urea.

6. A tubular casing according to claim 3 in which the component A of the aqueous liquid is composed of 1 to 10 per cent by weight, calculated on the total weight of the liquid, of dimethylol propylene urea.

7. A tubular casing according to claim 3 in which the component A of the aqueous liquid is composed of 1 to 10 per cent by weight, calculated on the total weight of the liquid, of dimethylol hydroxy-propylene urea.

8. A tubular casing according to claim 3 in which the component B of the aqueous liquid is a dispersion of fluorine-containing substances, which dispersion contains $\beta_1$. 12.5 per cent by weight of a polymer of

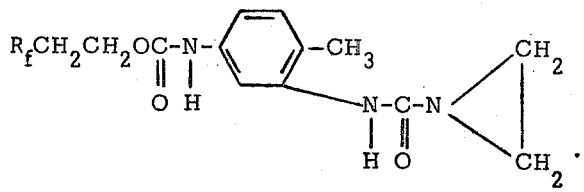

$\beta_2$. 12.5 per cent by weight

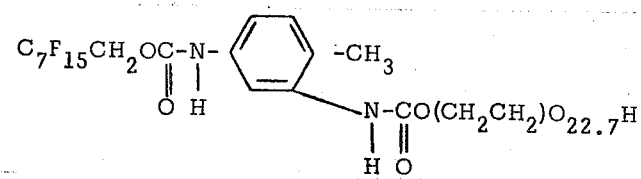

and 75 per cent by weight of water.

9. A tubular casing according to claim 1 in which the component B of the aqueous liquid is a dispersion of fluorine-containing substances, which dispersion contains $\beta_1$. 12.5 per cent by weight of a polymer of

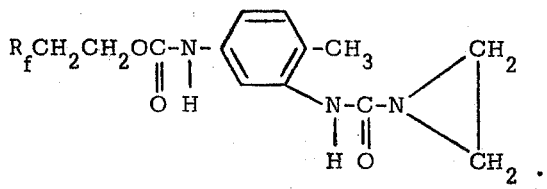

$\beta_2$. 12.5 per cent by weight

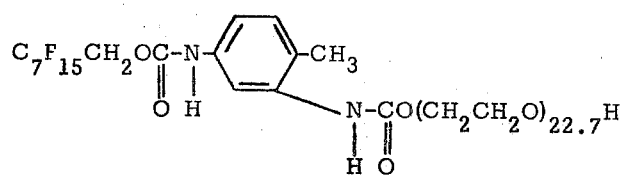

and 75 per cent by weight of water.

10. A process for the production of a tubular casing composed of an impregnating layer applied to the inner side of a tube of cellulose hydrate, which comprises causing an aqueous liquid to act on the inner surface of a cellulose hydrate tube in the gel state, which liquid contains A. 1 to 10 per cent by weight, calculated on the total weight of the liquid, of a water-soluble aminoplast precondensate, B. 1 to 4 per cent by weight, calculated on the total weight of the liquid, of a fluorine-containing two-component system from
$\beta_1$. polymers of fluorine-containing ethylene imines of the general formula

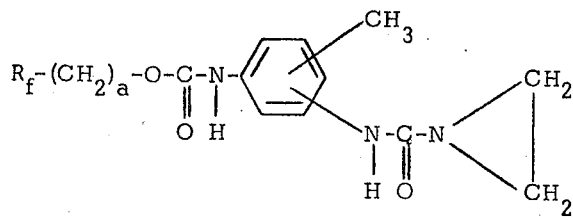

wherein
- $R_f$ is a straight or branched, saturated perfluorinated carbon chain with 6 to 10 carbon atoms, and a = 1 or 2, or polymers from mixtures of the above ethylene imines, dispersed in β₂. fluorine-containing compounds of the general formula

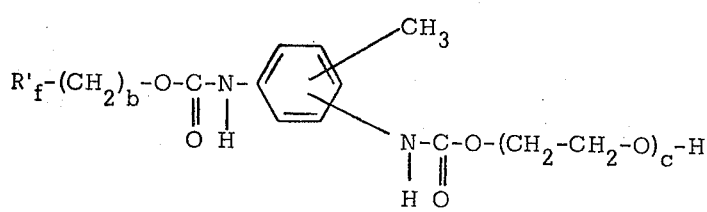

wherein
- $R'_f$ is a straight or branched, saturated perfluorinated carbon chain with 5 to 7 carbon atoms,
- b = 1 or 2,
- and c = 18 to 50 (corresponding to polyethylene glycol groups with an average molecular weight from about 800 to 2,000)

or in mixtures of the above compounds, provided that, in the component B of the liquid, the ratio $β_1$ to $β_2$ is in the range from 40 : 60 to 60 : 40 per cent by weight calculated on the total weight of the liquid, and C. 2 to 5 per cent by weight, calculated on the quantity of the aminoplast precondensate, of a water-soluble inorganic cross-linking catalyst, freeing the tube from excessive finishing liquid, heating the tube for a period of 10 seconds to 5 minutes to a temperature in the range between 100° and 150° C, and wetting the tube with water to bring it to a water content in the range of 8 to 12 per cent by weight, calculated on the total weight of the tube.

11. A process for the production of a tubular casing according to claim 10 in which the aqueous liquid contains as the constituent A 1 to 10 per cent by weight, calculated on the total weight of the liquid, of a water-soluble urea-formaldehyde precondensate.

12. A process for the production of a tubular casing according to claim 10 in which the aqueous liquid contains as the constituent A 1 to 10 per cent by weight, calculated on the total weight of the liquid, of a melamine-formaldehyde precondensate.

13. A process for the production of a tubular casing according to claim 10 in which the aqueous liquid contains as the constituent A 1 to 10 per cent by weight, calculated on the total weight of the liquid, of a urea-formaldehyde precondensate.

14. A process for the production of a tubular casing according to claim 10 in which the aqueous liquid contains as the constituent A 1 to 10 per cent by weight, calculated on the total weight of the liquid, of dimethylol ethylene urea.

15. A process for the production of a tubular casing according to claim 10 in which the aqueous liquid contains as the constituent A 1 to 10 per cent by weight, calculated on the total weight of the liquid, of dimethylol dihydroxyethylene urea.

16. A process for the production of a tubular casing according to claim 10 in which the aqueous liquid contains as the constituent A 1 to 10 per cent by weight, calculated on the total weight of the liquid, of dimethylol propylene urea.

17. A process for the production of a tubular casing according to claim 10 in which the aqueous liquid contains as the constituent A 1 to 10 per cent by weight, calculated on the total weight of the liquid, of dimethylol hydroxypropylene urea.

18. A process for the production of a tubular casing according to claim 10 in which the aqueous liquid contains as the constituent B a dispersion of fluorine-containing substances, which dispersion contains $β_1$. 12.5 per cent by weight of a polymer of

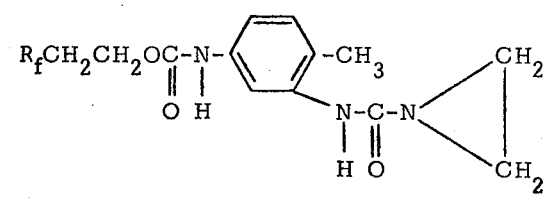

$R_f = C_6F_{13} : C_8F_{17} : C_{10}F_{21} = 1 : 1 : 1$ $β_2$. 12.5 per cent by weight of

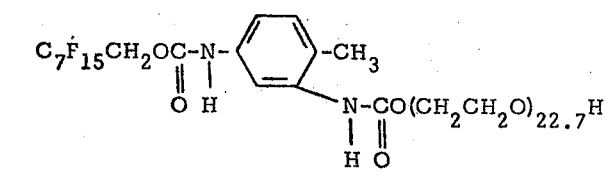

and 75 per cent by weight of water.

* * * * *